Jan. 5, 1932.  E. FLENTJE  1,839,306

AUXILIARY SPRING FOR AUTOMOBILE SEATS

Filed Nov. 15, 1929

Inventors
Ernst Flentje
by Heard Smith & Tennant.
Attys.

Patented Jan. 5, 1932

1,839,306

UNITED STATES PATENT OFFICE

ERNST FLENTJE, OF CAMBRIDGE, MASSACHUSETTS

AUXILIARY SPRING FOR AUTOMOBILE SEATS

Application filed November 15, 1929. Serial No. 407,501.

This invention relates to an auxiliary spring for the seat cushion of an automobile.

An automobile seat cushion is usually made somewhat thinner at the back edge than at the front. The weight of the person occupying the seat comes on the back portion of the cushion where it is thinnest to a greater extent than on the front edge where it is thicker.

My invention has for its object to provide a novel auxiliary spring construction which may be placed under the rear edge of the cushion and by which added resiliency is imparted to the cushion at this point.

In order to give an understanding of the invention I have illustrated in the drawings a selected embodiment thereof which will now be described after which the novel features will be pointed out in the appended claims.

Figure 1:
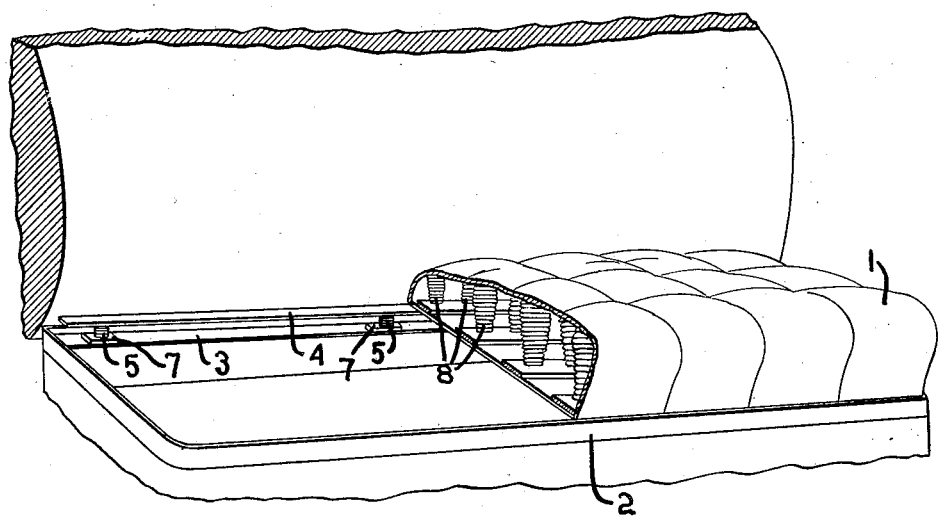
Fig. 1 is a fragmentary perspective view with parts broken out illustrating one form of my invention.
Figure 2:
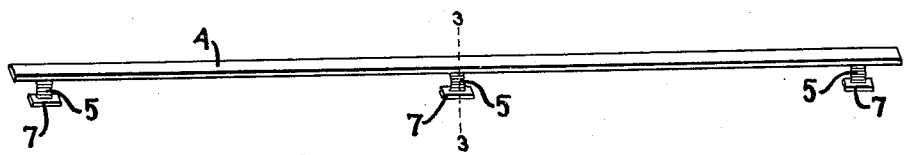
Fig. 2 is a view of the auxiliary spring device removed.
Figure 3:
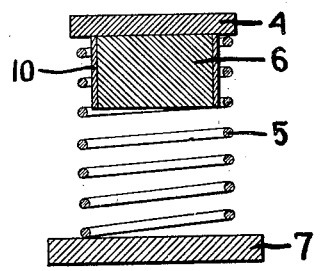
Fig. 3 is an enlarged section on the line 3—3, Fig. 2.

In the drawings 1 indicates an ordinary seat cushion of an automobile and 2 is the seat frame on which the cushion rests. This frame is provided with a ledge or shoulder 3 on which the cushion 1 is supported.

In the building of automobiles it is customary to make the seat cushions 1 somewhat thinner at the back edge than at the front edge so that the top surface of the cushion slants upwardly from the back to the front. As a result the springs at the rear edge of the cushion are shorter than those at the front edge with the result that the rear portion of the cushion where the weight of the body comes has less springiness or cushion effect than the front portion.

In order to augment the springiness or cushion effect of the seat at the rear edge I have provided the improved auxiliary spring device herein shown which is designed to be interposed between the rear edge of the cushion 1 and the rear ledge 3 on which the cushion rests.

My improved auxiliary spring comprises a bar 4 of spring steel which is long enough to extend substantially the full length of the cushion, and a plurality of spring supports 5 by which the bar is supported on the ledge 3.

These spring supports 5 are herein illustrated as coil or spiral springs and each is retained in position by means of a spring-positioning boss or projection 6 which is secured to the bar 4 and which is encircled by one of the springs 5. I have also shown seat members 7 of rubber or leather interposed between the spring supports 5 and the ledge 3, and attached to the lower ends of the spring supports 5 by any suitable means. These seat members not only prevent any noise which might be occasioned by direct contact of the spring supports 5 with the ledge 3 but they also serve to absorb body vibrations and thus reduce any vibrations that may be transmitted to the auxiliary spring.

When my improved auxiliary spring is in use the vibrations transmitted to the seat frame will be partially absorbed by the seat members 7 and spring supports 5 and will be partially absorbed by the spring bar 4 thereby reducing very materially the vibrations which would be transmitted to the under framing of the seat cushion.

In the preferred embodiment of my invention the spring supports 5 are placed so as to support the bar 4 at widely separated intervals. I have herein illustrated three such spring supports, one at each end and one in the center. Hence the weight of each of the persons occupying the automobile seat will come on the bar 4 between the two spring supports. Since this bar 4 is resilient of itself the cushion effect which the occupant of the seat experiences, in addition to that produced by the springs 8 of the seat cushion 1, will be provided partly by the resiliency of the spring supports 5 and partly by the resiliency of the bar 4.

The spring supports 5, being relatively short, will absorb rapid vibrations while the spring bar 4 will assist in cushioning the slower vibratory movements and as a result the combined action of the spring supports 5 and the bar 4 adds materially to the cushion effect of the seat cushion 1.

It not infrequently happens that after an automobile has been used for sometime the springs 8 at the rear edge of the cushion where the driver sits lose much of their resiliency and when this occurs they are entirely inadequate to absorb any severe bumps or jolts to which the automobile may be subjected.

With my improved auxiliary spring, however, the cushion 1 will still give a cushion effect even though the springs 8 are relatively ineffective, such cushion effect being the result of the action of the auxiliary spring device.

I have shown each spring-positioning projection 6 as being provided with a sleeve 10 of brass which reduces any tendency for the spring to squeak when in use.

The projection 6 may be secured to the bar 4 by being welded thereto or in any suitable way.

I claim:

1. An auxiliary spring device adapted for insertion under the rear edge of an inclined automobile seat cushion, comprising a flat resilient bar, having spring positioning projections rigid with said bar and extending from one flat face thereof, and coiled spring supports encircling said projections, said springs being adapted to rest on the supporting ledge of the seat frame, with said bar positioned to support the rear edge of the cushion.

2. An auxiliary spring device adapted for insertion under the rear edge of an inclined automobile seat cushion, comprising a flat resilient bar, having spring positioning projections rigid with said bar and extending from one flat face thereof, and coiled spring supports encircling said projections, said springs being adapted to rest on the supporting ledge of the seat frame, with said bar positioned to support the rear edge of the cushion, and seat members for said springs having vibration absorbing qualities attached to the spring supports and adapted to rest on the seat frame ledge.

In testimony whereof, I have signed my name to this specification.

ERNST FLENTJE.